United States Patent
Raghavan et al.

(10) Patent No.: US 11,082,118 B2
(45) Date of Patent: *Aug. 3, 2021

(54) METHODS FOR ASSISTING IN BEAM SWEEPING, TRACKING AND RECOVERY

(71) Applicant: QUALCOMM Incorporated, San Diego, CA (US)

(72) Inventors: Vasanthan Raghavan, West Windsor Township, NJ (US); Sundar Subramanian, San Diego, CA (US); Juergen Cezanne, Ocean Township, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,448

(22) Filed: Aug. 30, 2019

(65) Prior Publication Data
US 2019/0386735 A1 Dec. 19, 2019

Related U.S. Application Data

(63) Continuation of application No. 15/711,777, filed on Sep. 21, 2017, now Pat. No. 10,425,144.
(Continued)

(51) Int. Cl.
*H04L 12/66* (2006.01)
*H04B 7/08* (2006.01)
(Continued)

(52) U.S. Cl.
CPC ............ *H04B 7/088* (2013.01); *H04B 7/063* (2013.01); *H04B 7/0617* (2013.01);
(Continued)

(58) Field of Classification Search
CPC . H04W 24/10; H04W 72/046; H04W 72/085; H04B 7/088; H04B 7/0617; H04B 7/063; H04B 7/0695; H04B 7/0621
See application file for complete search history.

(56) References Cited

U.S. PATENT DOCUMENTS 9,787,371 B2 10/2017 Lakkis et al.
9,806,777 B1 10/2017 Doostnejad et al.
(Continued)

FOREIGN PATENT DOCUMENTS

JP 2010171648 A 8/2010
JP 2012531800 A 12/2012
(Continued)

OTHER PUBLICATIONS

Qualcomm Incorporated: "Initial Access Consideration for Millimeter Wave Systems [online]", 3GPP TSG-RAN WG1 #86, R1-166384, Aug. 3, 2016, [Retrieved: Nov. 14, 2016], 4 Pages, Internet URL: https://www.3gpp.org/ftp/tsg_ran/WG1_RL1/TSGR1_86/Docs/R1-166384.zip.
(Continued)

*Primary Examiner* — Abdelnabi O Musa
(74) *Attorney, Agent, or Firm* — Qualcomm IP Dept.; James Hunt Yancey, Jr.

(57) ABSTRACT

Certain aspects of the present disclosure provide various appropriate frame structures, sweep sequences, and procedures that may assist in beam sweeping, tracking and recovery.

65 Claims, 11 Drawing Sheets

Related U.S. Application Data

(60) Provisional application No. 62/402,897, filed on Sep. 30, 2016.

(51) Int. Cl.
  *H04B 7/06* (2006.01)
  *H04W 24/10* (2009.01)
  *H04B 7/0408* (2017.01)
  *H04W 72/04* (2009.01)
  *H04W 72/08* (2009.01)

(52) U.S. Cl.
  CPC ......... *H04B 7/0621* (2013.01); *H04B 7/0695* (2013.01); *H04W 24/10* (2013.01); *H04B 7/0408* (2013.01); *H04W 72/046* (2013.01); *H04W 72/085* (2013.01)

(56) References Cited

U.S. PATENT DOCUMENTS

| | | |
|---|---|---|
| 10,425,144 B2 | 9/2019 | Raghavan et al. |
| 2010/0215027 A1 | 8/2010 | Liu et al. |
| 2012/0093089 A1 | 4/2012 | Park et al. |
| 2013/0215844 A1* | 8/2013 | Seol ............... H04B 7/0695 370/329 |
| 2013/0301454 A1 | 11/2013 | Seol et al. |
| 2016/0021548 A1 | 1/2016 | Raghavan et al. |
| 2016/0150591 A1* | 5/2016 | Tarighat Mehrabani ................ H04L 27/18 370/329 |
| 2016/0198474 A1 | 7/2016 | Raghavan et al. |
| 2016/0308637 A1* | 10/2016 | Frenne ............... H04J 11/0069 |
| 2016/0329943 A1 | 11/2016 | Selén et al. |
| 2016/0353424 A1* | 12/2016 | Stirling-Gallacher ................ H04B 7/0626 |
| 2016/0353510 A1* | 12/2016 | Zhang ............... H04B 7/0617 |
| 2017/0280365 A1* | 9/2017 | Wang ............... H04W 36/0055 |
| 2017/0366992 A1 | 12/2017 | Rune et al. |
| 2018/0006770 A1* | 1/2018 | Guo ............... H04L 1/1835 |
| 2018/0049055 A1 | 2/2018 | Wiberg et al. |
| 2018/0248601 A1* | 8/2018 | Kishiyama ......... H04B 7/0417 |

FOREIGN PATENT DOCUMENTS

| | | |
|---|---|---|
| JP | 2013517645 A | 5/2013 |
| WO | 2010056885 A1 | 5/2010 |
| WO | 2011087258 A2 | 7/2011 |
| WO | 2015080646 A1 | 6/2015 |

OTHER PUBLICATIONS

Cordeiro C., "CP-Specification ; 11-10-0433-00-00adcp-specification", IEEE Draft; 11-10-0433-00-00AD-CP-Specification, IEEE-SA Mentor, Piscataway, NJ, USA, vol. 802.11 ad, May 2, 2010 (May 2, 2010), pp. 1-336, XP017677171, [retrieved on May 2, 2010].

International Search Report and Written Opinion—PCT/US2017/052945—ISA/EPO —dated Mar. 29, 2018.

Partial International Search Report—PCT/US2017/052945—ISA/EPO —dated Nov. 29, 2017.

Xinwei: "Considerations on Beam Management for NR", 3GPP Draft; R1-166583 Considerations on Beam Management for NR, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), 6 Pages, XP051140289, Retrieved from the Internet: URL: http://www.3gpp.org/ftp/Meetings_3GPP_Sync/RAN1/Docs/ [retrieved on Aug. 21, 2016].

European Search Report—EP2115232—Search Authority—Munich—dated Apr. 13, 2021.

* cited by examiner

METHODS FOR ASSISTING IN BEAM SWEEPING, TRACKING AND RECOVERY

CROSS-REFERENCE TO RELATED APPLICATIONS

This application is a continuation of U.S. patent application Ser. No. 15/711,777, filed Sep. 21, 2017, which claims the benefit of U.S. Provisional Application Ser. No. 62/402,897 entitled "METHODS FOR ASSISTING IN BEAM SWEEPING, TRACKING AND RECOVERY," filed on Sep. 30, 2016. The aforementioned applications are herein incorporated by reference in their entirety.

INTRODUCTION

Aspects of the present disclosure relate generally to wireless communications systems, and more particularly, to supporting beamforming.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication that may be performed, for example, by a user equipment (UE). The method generally includes determining a sequence over which at least one of transmit beams of a base station (BS) or receive beams of the UE are scanned over different symbols or symbol portions, and participating in a beam refinement procedure based on the sequence.

Certain aspects of the present disclosure provide a method for wireless communication that may be performed, for example, by a base station (BS). The method generally includes determining a sequence over which at least one of transmit beams of the BS or receive beams of a user equipment (UE) are scanned over different symbols or symbol portions, and participating in a beam refinement procedure based on the sequence.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
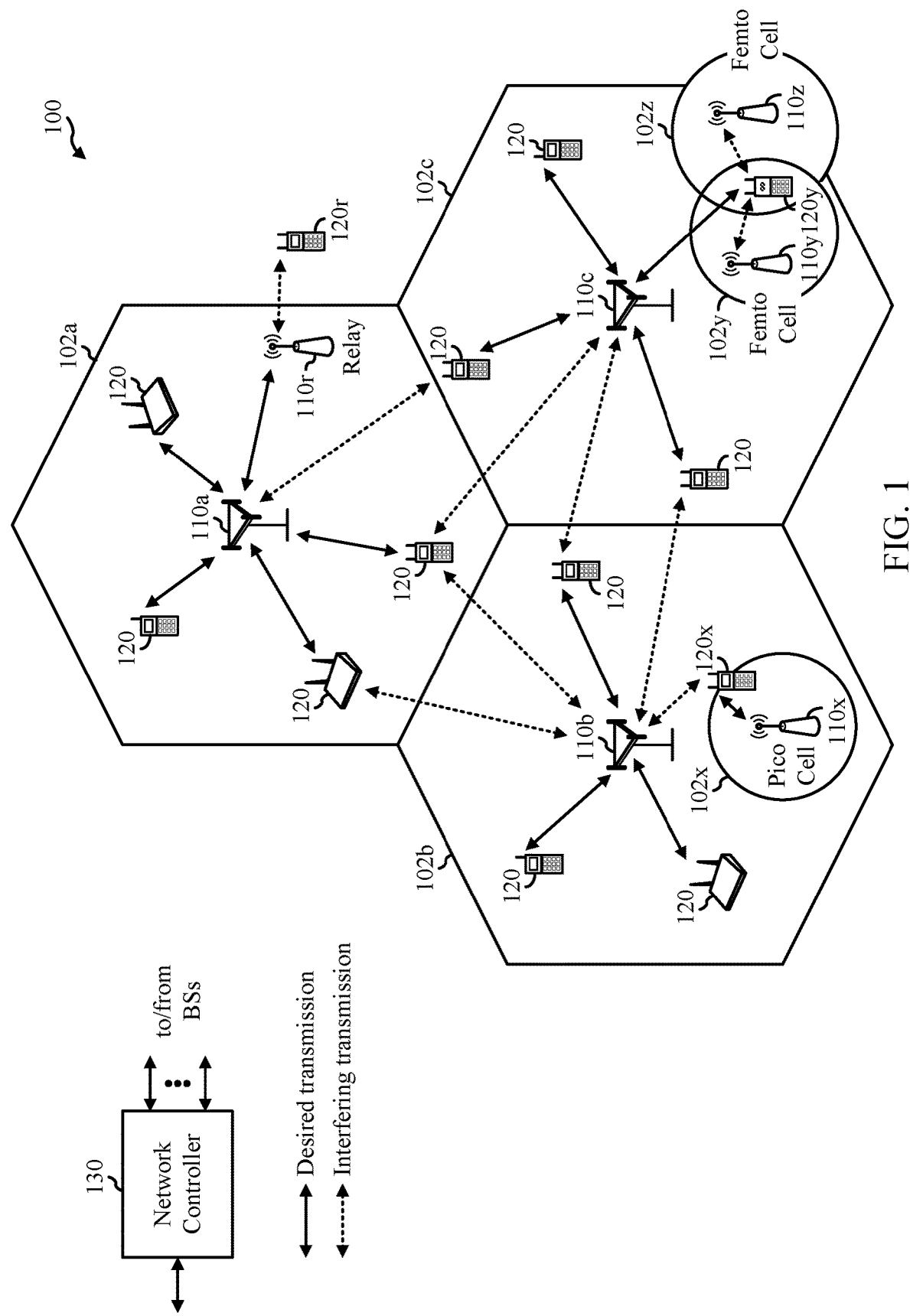
FIG. 1 is a block diagram conceptually illustrating an example telecommunications system, in accordance with certain aspects of the present disclosure.

Aspects of the present disclosure provide apparatus, methods, processing systems, and computer readable mediums for operations that may be performed in new radio (NR) applications (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Beam sweeping, tracking and recovery are considered in the NR enhancements of 3GPP. These may be of particular importance for mmW aspects. Aspects of the present disclosure provide various appropriate frame structures, sweep sequences, and procedures that may assist in beam sweeping, tracking and recovery.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network.

According to aspects of the present disclosure, one or more base stations 110 and UEs 120 may communicate using beamforming. Aspects of the present disclosure provide various appropriate frame structures, sweep sequences, and procedures that may assist in beam sweeping, tracking and recovery to improve communication using beamforming.

As will be described in more detail herein, a UE may be in a zone including a serving TRP and one or more non-serving TRPs. The serving and non-serving TRPs may be managed by the same ANC (see e.g., ANC 202 managing three TRPs 208 in FIG. 2). In certain scenarios, the UE may wake up to perform cell searches to enhance decoding of paging messages. For example, performing a cell search prior to decoding a paging message may allow the UE to select a strongest cell (e.g., identified in the cell search).

According to aspects for supporting UL mobility without zone signals, a UE may transmit a first UL chirp signal. The UE may receive a keep alive (KA) signal, in response to the first chirp signal. The KA may be received in a first wake period of a discontinuous receive (DRx) cycle. The UE may transmit a second chirp signal using information determined from the KA signal. Thus, the UE may transmit a second chirp signal without the use of a DL zone synchronization signals. Advantageously, the UE may use information from the KA signal (and in information from a zone signal) to transmit a subsequent chirp signal. For example, the UE may determine a transmit power (for open loop power control) based on the KA. According to another example, the UE may decode a power control field in the KA and transmit the second chirp signal based, at least in part on decoded power control information.

UEs 120 may be configured to perform the operations 1100 and other methods described herein and discussed in more detail below which may help improve DL-based mobility. Base station (BS) 110 may comprise a transmission reception point (TRP), Node B (NB), 5G NB, access point (AP), new radio (NR) BS, etc.). The NR network 100 may include the central unit.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 10 and 11. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
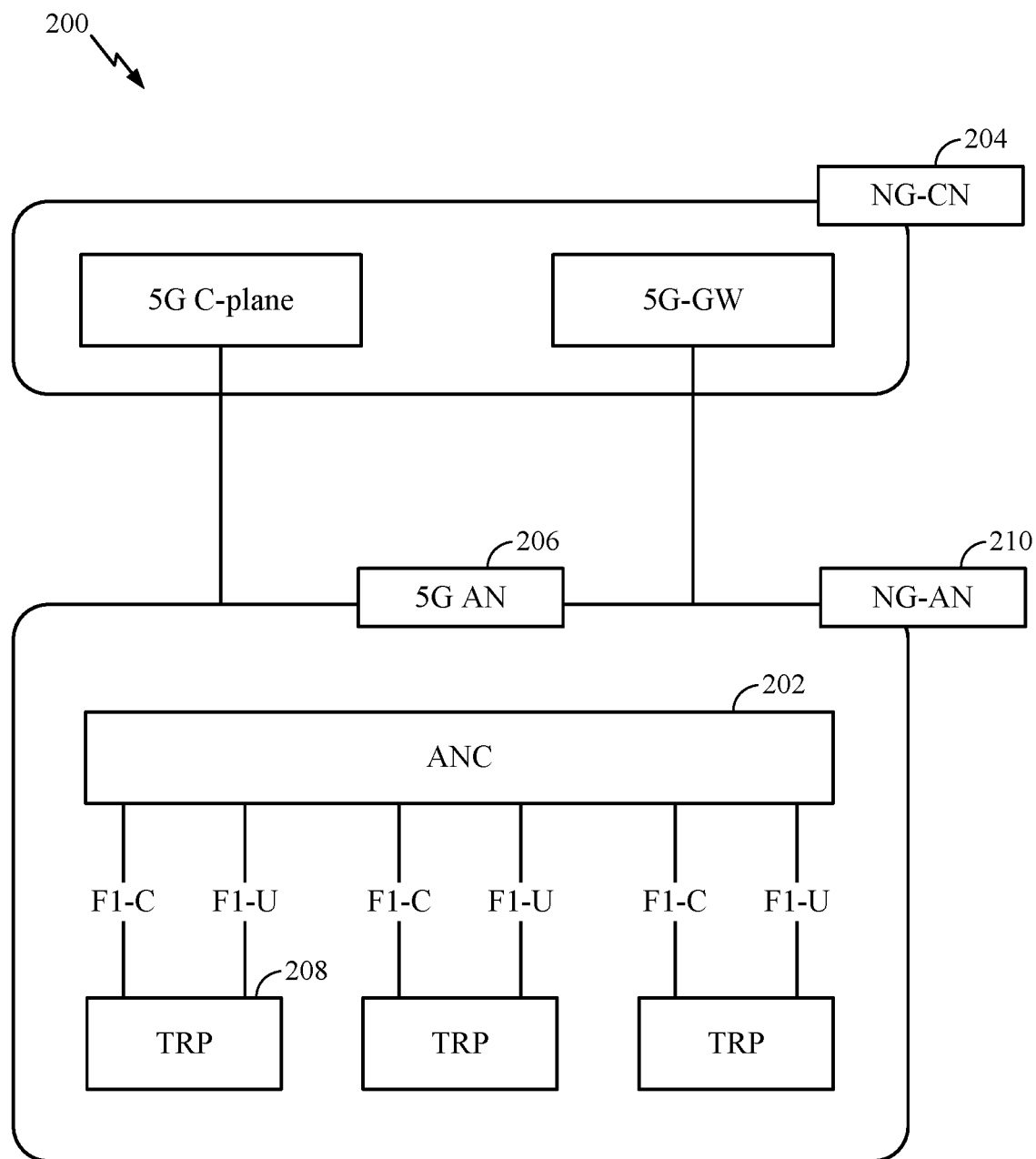
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
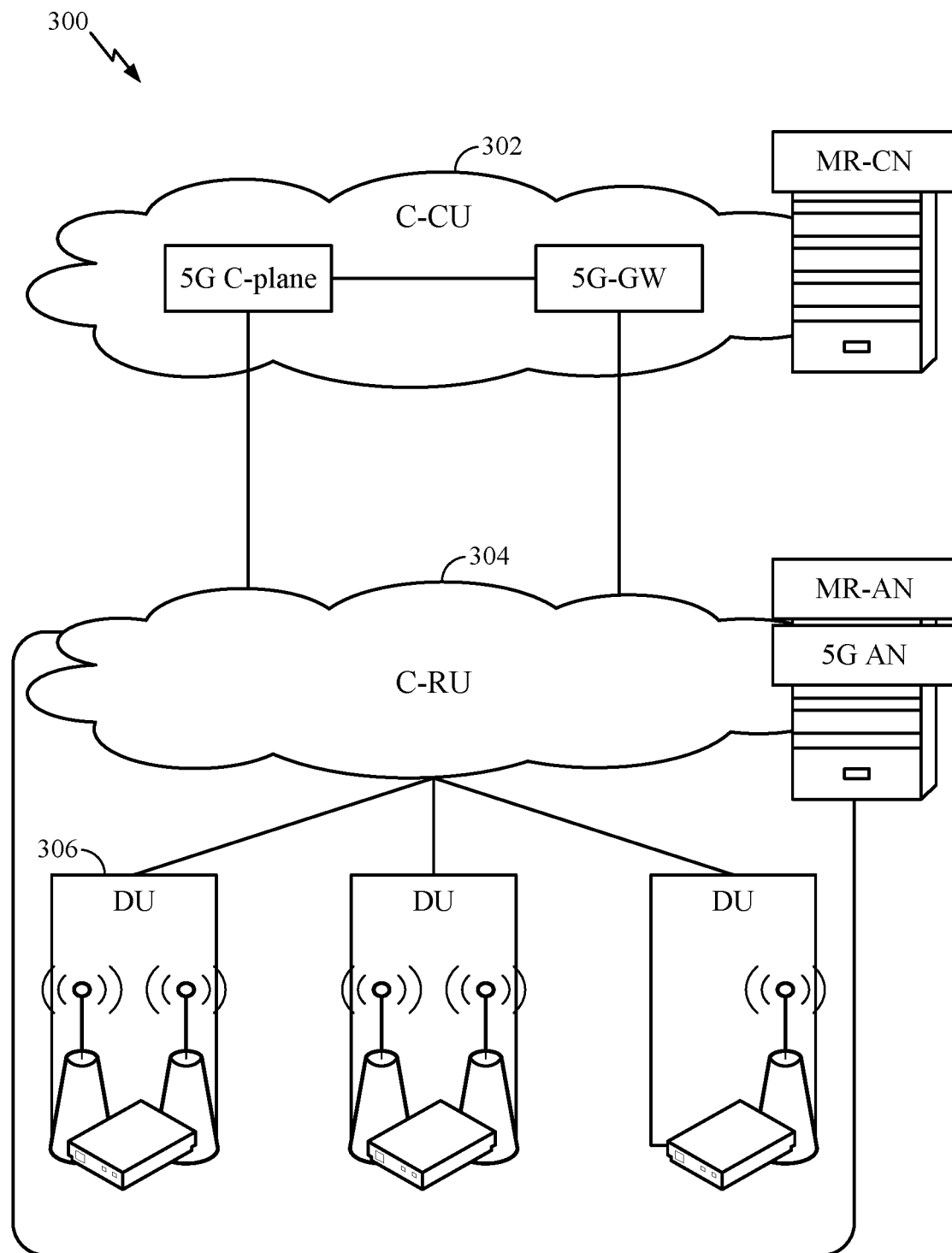
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
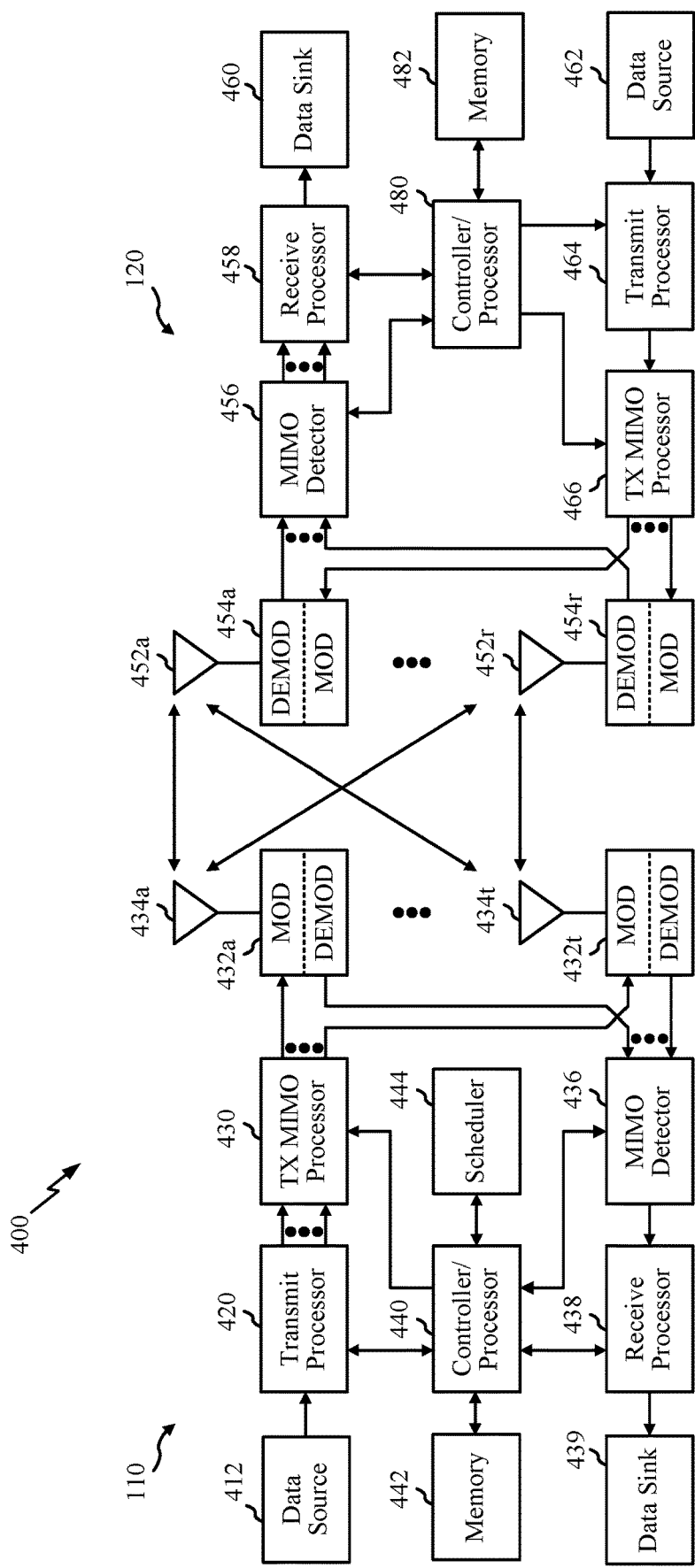
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. For example, UE 120 and BS 110 may be configured to perform beam sweeping, tracking and recovery using the frame structures, sweep sequences, and procedures described herein (e.g., with reference to FIGS. 9A-9D).

As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for a primary synchronization signal (PSS), primary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. processes for the techniques described herein. The processor 480 and/or other processors and modules at the UE 120 may also perform or direct, e.g., the execution of the functional blocks illustrated in FIGS. 10 and 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
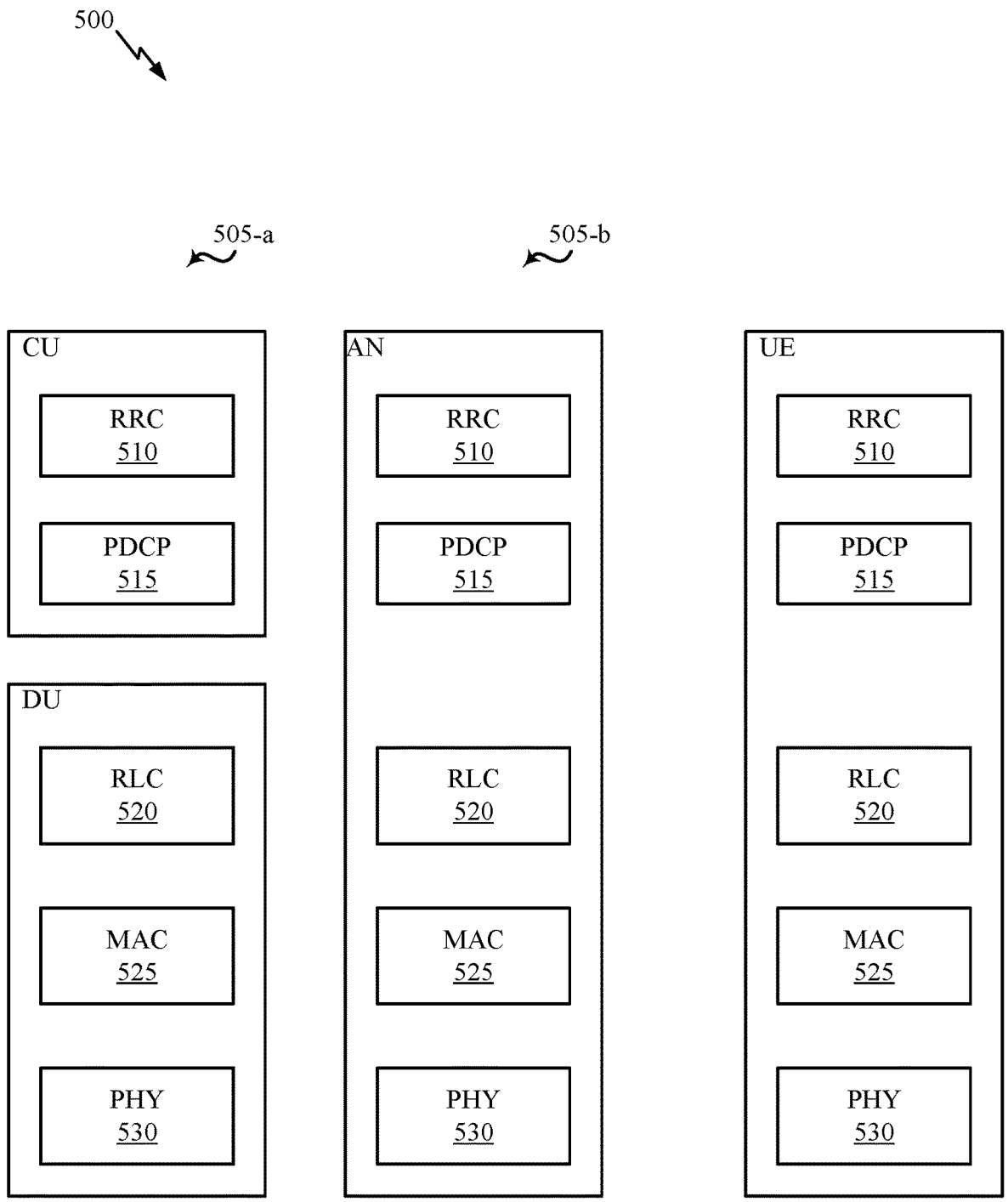
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
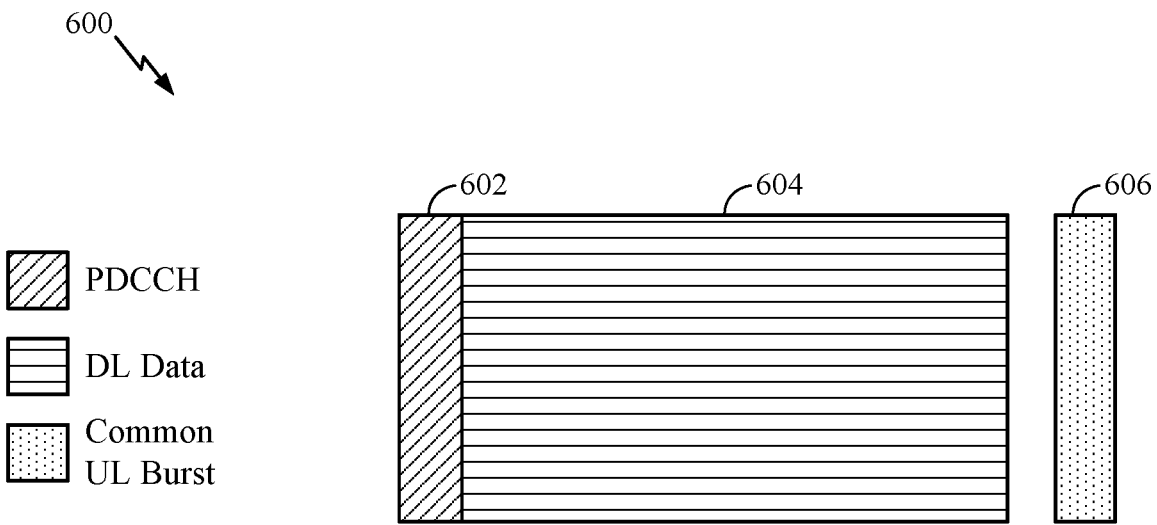
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
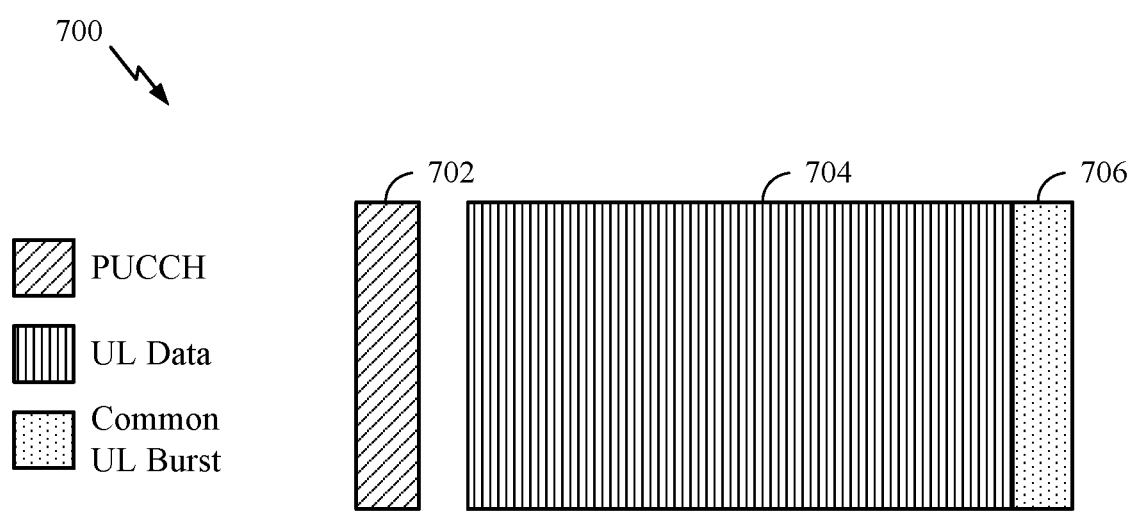
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical downlink (DL) control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Training Procedures

As noted above, in certain multi-beam systems (e.g., millimeter wave (mmW) cellular systems), beamforming may be needed to overcome high path-losses. As described herein, beamforming may refer to establishing a link between a BS and UE, wherein both of the devices form a beam (e.g., exciting a certain subset of clusters in the channel). Both the BS and the UE find at least one adequate beam to form a communication link. BS-beam and UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects, blockages, etc. Additionally, the performance of a BPL may be subject to fading due to Doppler spread. Because of changing channel conditions over time, the BPL may be periodically updated or refined. Accordingly, it may be beneficial if the BS and the UE monitor beams and new BPLs.

At least one BPL has to be established for network access. As described above, new BPLs may be discovered later for different purposes. The network may decide to use different BPLs for different channels, or for communicating with different BSs (TRPs) or as fall-back BPLs in case an existing BPL fails or gets blocked.

The UE typically monitors the quality of a BPL and the network may refine a BPL from time to time.

Figure 8:
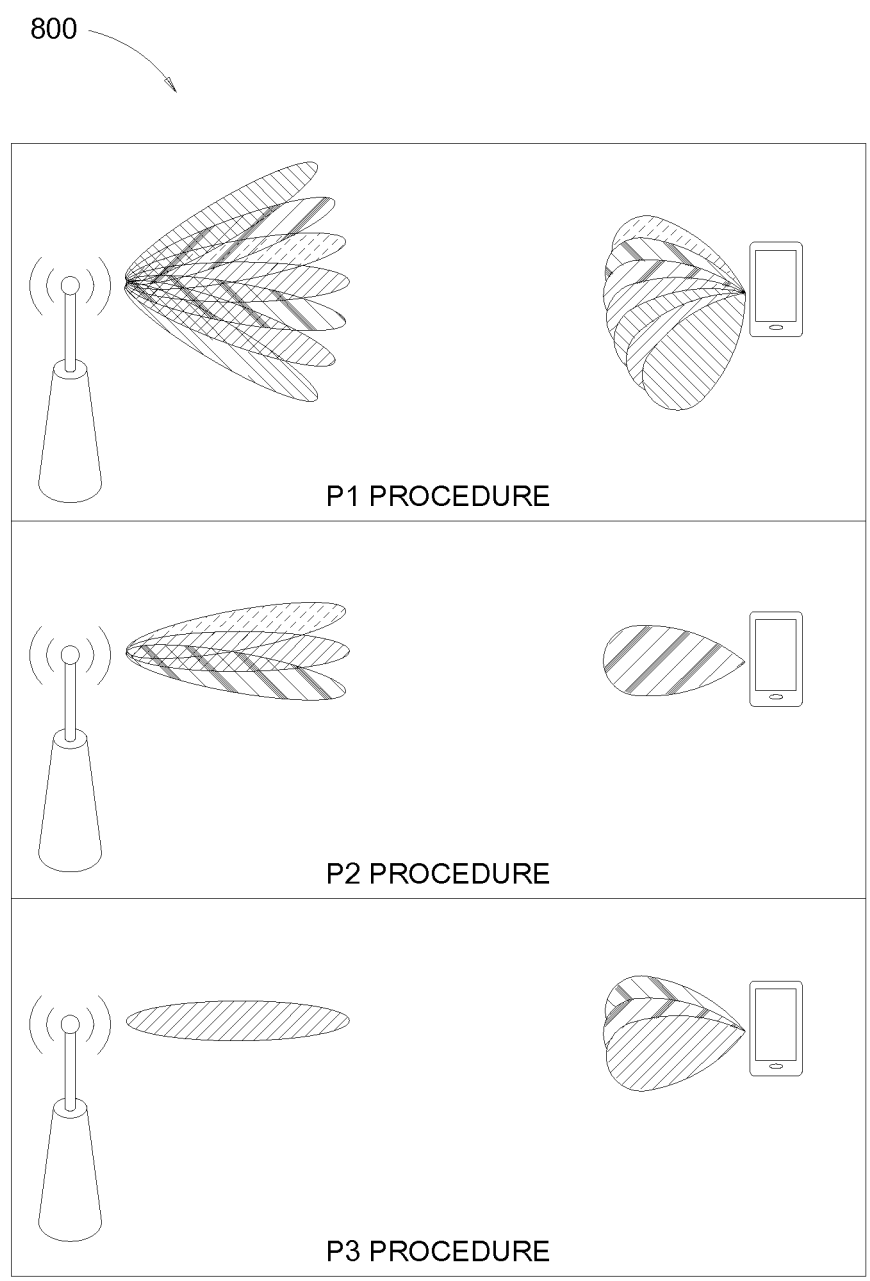
FIG. 8 illustrates an example of a P1, P2, and P3 procedure, in accordance with certain aspects of the present disclosure.

FIG. 8 illustrates example 800 for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 8, the BS transmits different symbols of a reference signal, each beamformed in a different spatial direction such that several (most, all) relevant places of the cell are reached. Stated otherwise, the BS transmits beams using different transmit beams over time in different directions.

For successful reception of at least a symbol of this "P1-signal", the UE has to find an appropriate receive beam. It searches using available receive beams and applying a different UE-beam during each occurrence of the periodic P1-signal.

Once the UE has succeeded in receiving a symbol of the P1-signal it has discovered a BPL. The UE may not want to wait until it has found the best UE receive beam, since this may delay further actions. The UE may measure the reference signal received power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 8). The BS-beams used for P2 may be different from those for P1 in that they may be spaced closer together or they may be more focused. The UE may measure the RSRP for the various BS-beams and indicate the best one to the BS.

The P3 procedure refines the UE-beam of a BPL (see P3 procedure in FIG. 8). While the BS-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the BS.

Over time, the BS and UE establish several BPLs. When the BS transmits a certain channel or signal, it lets the UE know which BPL may be involved, such that the UE may tune in the direction of the correct UE receive beam before the signal starts. In this manner, every sample of that signal or channel may be received by the UE using the correct receive beam. In an example, the BS may indicate for a scheduled signal (SRS, CSI-RS) or channel (PDSCH, PDCCH, PUSCH, PUCCH) which BPL is involved. In NR, this information is called quasi-collocation (QCL) indication.

Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and RRM management functionality.

The BS may use a BPL which the UE has received in the past. The transmit beam for the signal to be transmitted and the previously-received signal both point in a same direction or are QCL. The QCL indication may be needed by the UE (in advance of the signal to be received) such that the UE may use a correct receive beam for each signal or channel. Some QCL indications may be needed from time to time when the BPL for a signal or channel changes and some QCL indications are needed for each scheduled instance. The QCL indication may be transmitted in the downlink control information (DCI) which may be part of the PDCCH channel. Because DCI is needed to control the information, it may be desirable that the number of bits needed to indicate the QCL is not too big. The QCL may also be transmitted in a medium access control-control element (MAC-CE) or radio resource control (RRC) message.

According to one example, whenever the UE reports a BS beam that it has received with sufficient RSRP, and the BS decides to use this BPL in the future, the BS assigns it a BPL tag. Accordingly, two BPLs having different BS beams may be associated with different BPL tags. BPLs that are based on the same BS beams may be associated with the same BPL tag. Thus, according to this example, the tag is a function of the BS beam of the BPL.

As noted above, wireless systems, such as millimeter wave (mmW) systems, bring gigabit speeds to cellular networks, due to availability of large amounts of bandwidth. However, the unique challenges of heavy path-loss faced by such wireless systems necessitate new techniques such as hybrid beamforming (analog and digital), which are not present in 3G and 4G systems. Hybrid beamforming may enhance link budget/signal to noise ratio (SNR) that may be exploited during the RACH process.

In such systems, the enhanced node B (eNB) and the user equipment (UE) may communicate over active beamformed transmission beams. Active beams may be considered paired transmission (Tx) and reception (Rx) beams between the eNB and UE that carry data and control channels such as PDSCH, PDCCH, PUSCH, and PUCCH. As noted above, a transmit beam used by a eNB and corresponding receive beam used by a UE for downlink transmissions may be referred to as a beam pair link (BPL). Similarly, a transmit beam used by a UE and corresponding receive beam used by a eNB for uplink transmissions may also be referred to as a BPL.

In order for beamforming to function correctly, the eNB may need to monitor beams using beam measurements performed (e.g., based on reference signals transmitted by the eNB) and feedback generated at the UE. For example, the eNB may monitor active beams using UE-performed measurements of signals such as NR-SS, CSI-RS, DMRS-CSS and DMRS-USS. For that, eNB may send measurement request to the UE and may subsequently transmit one or more reference signals for measurement at the UE.

Since the direction of a reference signal is unknown to the UE, the UE may need to evaluate several beams to obtain the best Rx beam for a given eNB Tx beam. However, if the UE has to "sweep" through all of its Rx beams to perform the measurements (e.g., to determine the best Rx beam for a given eNB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

Example Methods for Assisting in Beam Sweeping, Tracking and Recovery

As described above, beam training (i.e., beam sweeping, refinement, tracking and recovery) is considered in the NR enhancements of 3GPP. These may be of particular importance for mmW aspects. Aspects of the present disclosure provide various appropriate frame structures, sweep sequences, and procedures that may assist in beam sweeping, tracking and recovery.

Beamforming generally refers to the use of multiple antennas to control the direction of a wavefront by appropriately weighting the magnitude and phase of individual antenna signals (for transmit beamforming). Beamforming may result in enhanced coverage, as each antenna in the array may make a contribution to the steered signal, an array gain (or beamforming gain) is achieved. Receive beamforming makes it possible to determine the direction that the wavefront will arrive (direction of arrival, or DoA). It may also be possible to suppress selected interfering signals by applying a beam pattern null in the direction of the interfering signal.

Adaptive beamforming refers to the technique of continually applying beamforming to a moving receiver. Aspects of the present disclosure may help improve adaptive beamforming by providing appropriate frame structures, sweep sequences, and procedures that may assist in beam sweeping, tracking and recovery used in adaptive beamforming.

Various beam management procedures may be implemented and supported within one or multiple TRPs.

In some cases, such as in the P1 procedure described above, a UE may be enabled to make measurements on different TRP Tx beams to support selection of TRP Tx beams/UE Rx beam(s). For beamforming at a TRP, it typically includes an intra/inter-TRP Tx beam sweep from a set of different beams. For beamforming at UE, it typically includes a UE Rx beam sweep from a set of different beams. TRP Tx beam(s) and UE Rx beam(s) can be determined jointly or sequentially.

In some cases, such as in the P2 procedure described above, a UE may be enabled to make measurements on different TRP Tx beams to possibly change inter/intra-TRP Tx beam(s). The change may be from a possibly smaller set of beams for beam refinement than used above in the selection of TRP Tx and/or UE Rx beams.

In some cases, such as in the P3 procedure described above, a UE may be enabled to make measurements on the same TRP Tx beam to change UE Rx beam in the case UE uses beamforming. It may be desirable to try and implement a same procedure design for Intra-TRP and inter-TRP beam management. However, a UE may not know whether it is intra-TRP or inter TRP beam. Procedures P2 and P3 described above may be performed jointly and/or multiple times to achieve e.g. TRP Tx/UE Rx beam change simultaneously.

The P3 procedure may or may not have physical layer procedure specification impact and may support managing multiple Tx/Rx beam pairs for a UE. In some cases, assistance information from another carrier may be considered in beam management procedures. One or more of the procedures may be applied to any frequency band and can be used in single/multiple beam(s) per TRP.

Aspects of the present disclosure provide structures and techniques that may be applied to beam sweeping, tracking and management procedures.

Aspects of the present disclosure describe beam training (i.e., beam sweeping, beam refinement, etc.) procedures that may involve the use of multiple beamforming vectors (e.g., broad/narrow directional beams, multi-directional beams, beams designed for interference management, etc.) to scan at both the eNB and UE sides. In examples presented herein, different beams are scanned from multiple antenna ports at the eNB side with different REs allocated and carrying orthogonal waveforms for these ports. This may allow the UE to simultaneously evaluate multiple beams over a single symbol. Multiple RF chain capabilities at the UE may help speed candidate beam pair evaluation during these procedures.

In the case of beam sweeping (P1 procedure) and beam refinement (P2 and P3 procedures), both eNB and UE side sweeping/refinement may be considered since significant performance improvement can be realized with sweeping/refinement at either end. In particular, an example may be considered with the number of beams to be scanned at the eNB side being NB with the number of beams to be scanned at the UE side being NU with NB≥NU.

Aspects of the present disclosure provide multiple options/types of sweeping sequences amenable to this asymmetry. While these options are described below, with reference to a sequence of 12 beam sweeps to facilitate understanding, those skilled in the art will recognize that generalization to sequences other numbers is possible.

Figure 9A:
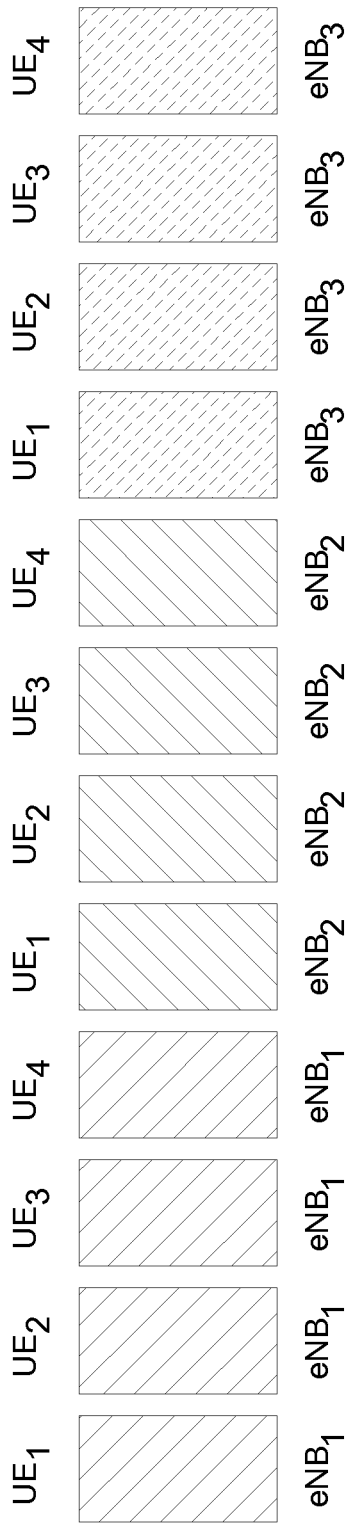
FIG. 9A-9D illustrate different beam sweep sequences, in accordance with certain aspects of the present disclosure.
Figure 9B:
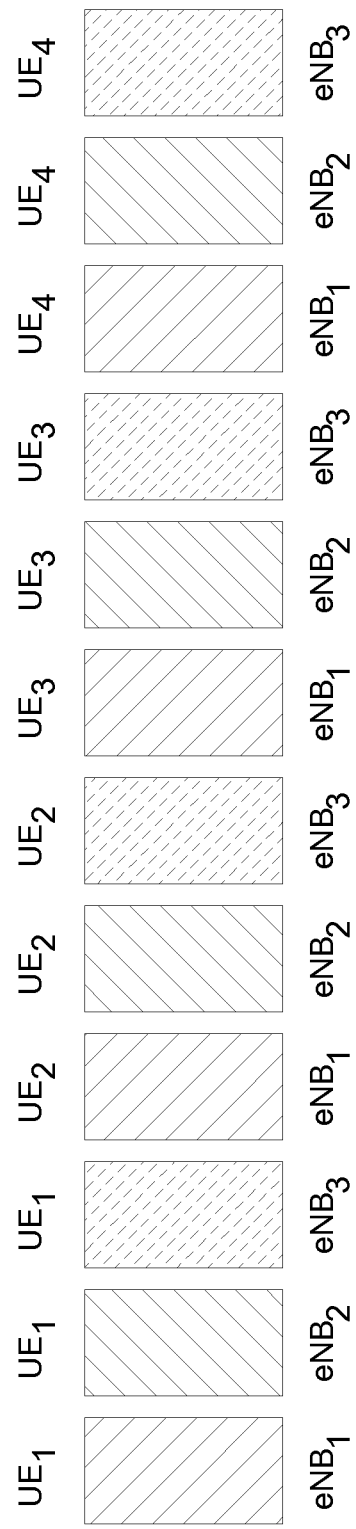

Referring first to FIGS. 9A and 9B, one type of beam sweep sequence in which multiple candidate beams are evaluated at the eNB and UE sides is illustrated. Both eNB side as well as UE side beam sweeping/refinement are possible with this type of sequence. The example sequences shown in FIGS. 9A and 9B may be especially useful for application during the P1 procedure.

In example FIG. 9A, the eNB remains fixed over a single beam over a contiguous set of symbols as the UE cycles through its beams. In the illustrated example, the eNB scans through the same beam over four symbols (illustrated with the same shade of grey) as the UE beam changes from symbol to symbol over the sequence.

On the other hand, in example FIG. 9B, the UE remains fixed over a single beam over a contiguous set of symbols as the eNB cycles through its beams. UE scans through the same beam over three symbols as the eNB beam changes from symbol to symbol over the sequence.

Either of the example sequences in FIG. 9A or 9B may be useful, for instance, depending on the beam switching time constraints at the eNB and UE, respectively. Typically, the beam switching constraint may be more relaxed at the eNB side (relative to the UE side) and, thus, the example sequence in example FIG. 9B may be more useful in many cases.

Figure 9C:
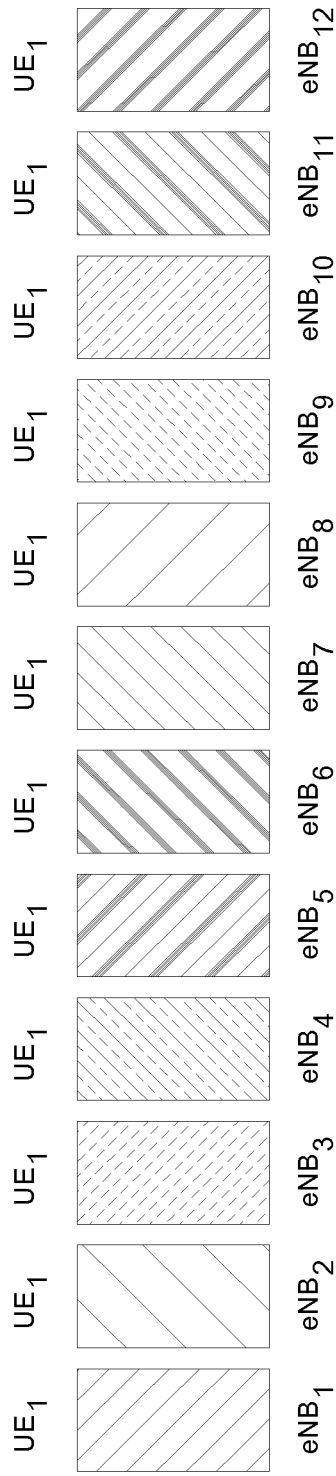
Figure 9D:
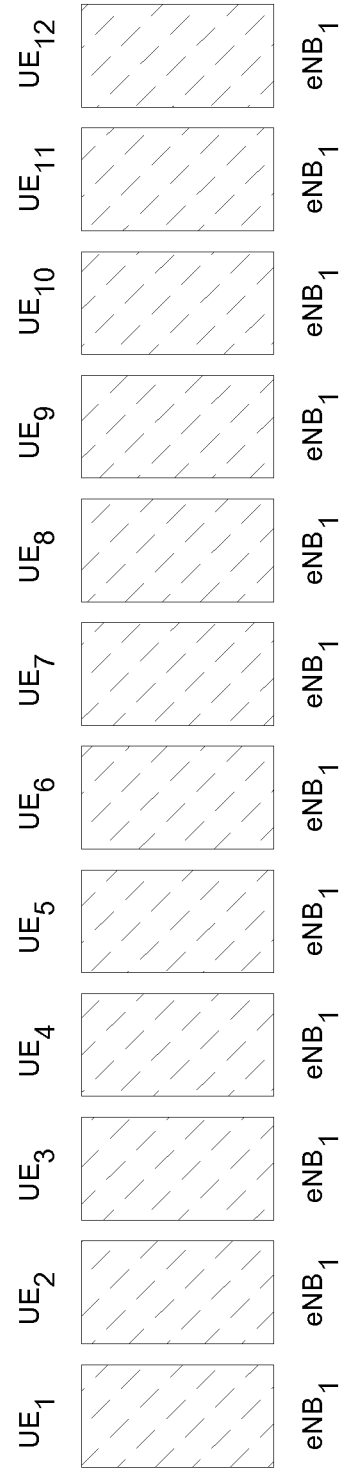

FIG. 9C illustrates another type of beam sweep sequence, in which the eNB round-robins through its beams one by one while the UE is beamformed along a specific beam (e.g., a low gain pseudo-omni beam that has an approximately flat beam pattern in the beamspace). In the illustrated example, the eNB scans through 12 different beams (illustrated with shades of grey) as the UE beam remains fixed over the sequence. This process may be repeated across the same/ different UE side beams across different subframes for RSRP improvement, subarray scanning, subarray diversity combining, etc. The example sequence shown in FIG. 9C is also amenable for quick eNB beam refinement or beam recovery and, therefore, it may be especially useful for application during the P2 procedure FIG. 9D illustrates another type of beam sweep sequence, in which the eNB beam is kept fixed as the UE round-robins through all its beams with the process repeated through different eNB beams across different subframes for RSRP improvement, or other purposes. In the illustrated example, the eNB scans through the same beam (illustrated with the same shade of grey) as the UE beam changes from symbol to symbol over the sequence This type of sequence may be useful for a quick scan through different subarrays at the UE side, if necessary. The example sequences shown in FIG. 9D may be especially useful for application during the P3 procedure.

As illustrated by these example shown in FIGS. 9A-9D, different types of beam sweep sequences for different levels of beam refinement at eNB and UE sides may be considered. To decide on a particular sequence for any given scenario, performance tradeoffs with the different sequences may be studied (e.g., with mmW channel models). As described above, in some embodiments, the sweeping sequences are used when both the BS and UE engage in beam training during the same assignment.

In some embodiments, to help speed up the beam pair evaluation, the eNB may provide signaling to assist the UE in beamformer candidate selection. For example, the eNB can inform the UE which beams it should be expected to scan over the beam sequence, for example, corresponding to specific choices in terms of subarrays, beam types, beams, and the like. This information may be based on either a prior report such as those based on an uplink beam sweep, or similar approaches that allow the eNB to learn about the UE's beam candidate possibilities. Additional consideration may also be placed, for example, on appropriate latencies necessary for the UE beams to be set up based on eNB signaling.

There are various options for measurements to take and report for beam sweep procedures. In terms of measurements made in the beam sweeping/refinement procedures at the UE side, multiple options can be considered. In some cases, reference signal received power (RSRP) or reference signal received quality (RSRQ) measurements across either the entire band or sub-bands may be useful if the UE could feed this information back to the eNB.

In some embodiments, complex-valued signal comparisons (e.g., ratios/differences) across multiple beam candidates on different panels/polarizations may useful in combining beams that point in similar directions across these panels/polarizations (and may be fed back to the eNB). Such combining may effectively improve the energy in rank-1 transmissions by coherent combining across panels/polarizations. Additionally, such complex-valued signal comparisons could also assist in multi-directional/coherent beamforming in higher-rank transmissions.

Generalizing the examples described above, the covariance matrix of the post-beamforming received signal vector across different ports/RF chains may be considered and a UE may report (quantized) entries of this matrix to the eNB to assist in beamforming.

Aspects of the present disclosure provide techniques for measuring and feeding back wideband/sub-band based RSRP, RSRQ, complex-valued signal comparisons across multiple beam candidates, covariance matrix of post-beamforming received signal vector across different ports/RF chains, etc. in response to different beam sweeping/refinement procedures. Those skilled in the art will recognize that various other feedback mechanisms, as well as other measurement reports, may also be implemented.

For beam recovery, a beam acknowledgment report may be sent by the UE if an eNB beam sweep is lost due to packet drop. Alternately, it may be the case that either the eNB/UE side beams are lost either due to sudden blocking of dominant clusters/paths in the channel, UE mobility, etc. In such scenarios, quick recovery mechanisms may be implemented, in an effort to ensure that the link is not lost irrevocably. Beam sweep sequence such as those shown in FIG. 9C may be amenable to such scenarios.

The use of wider/broader beams in control channels may also be utilized that trade off peak beamforming gain for robustness across a large angular spread thus preventing its loss due to issues such as blockage. Hierarchical beam design in the context of beam recovery may also be important. The beam sweep sequences and techniques presented herein may be amenable to beam recovery.

Figure 10:
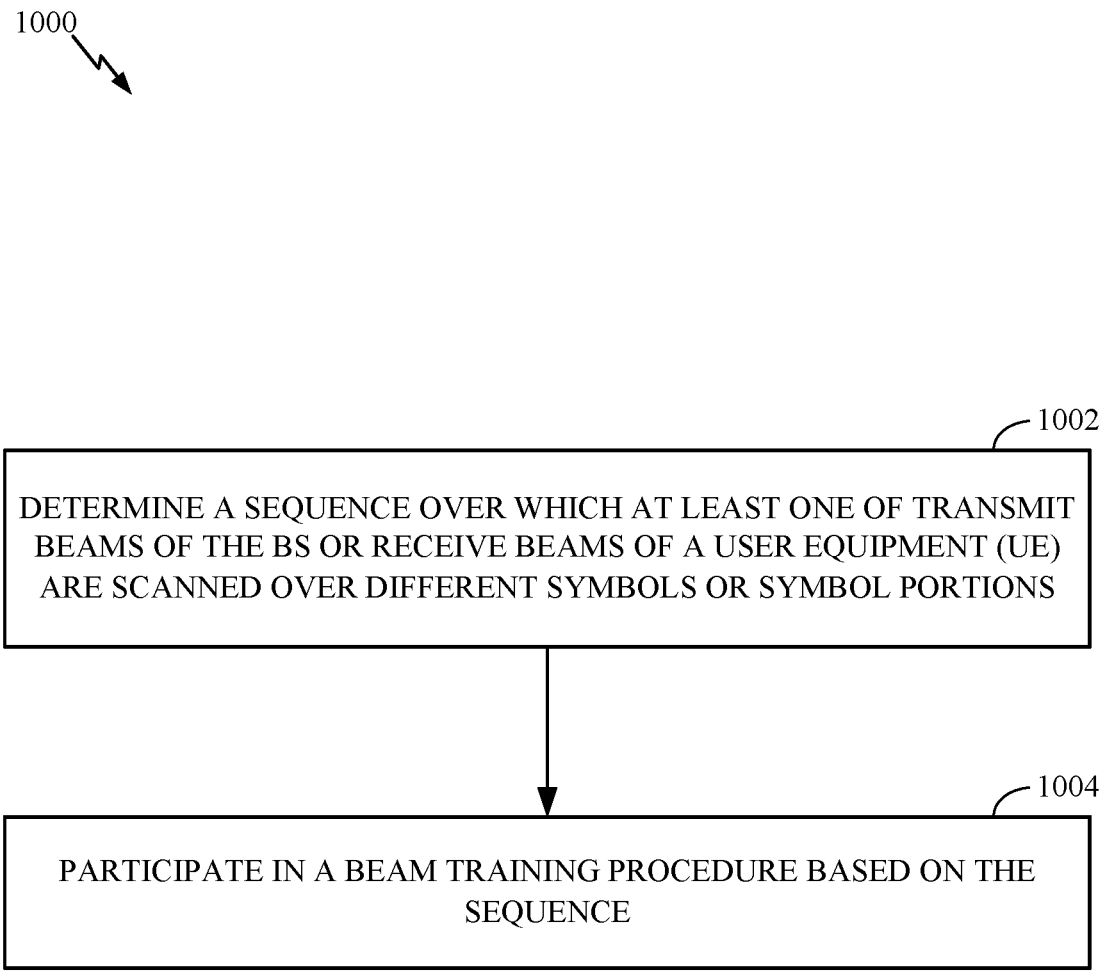
FIG. 10 illustrates example operations that may be performed by a BS, in accordance with certain aspects of the present disclosure.

FIG. 10 illustrates example operations for use by a base station (BS), such as an eNB, in accordance with certain aspects of the present disclosure. Operations 1000 begin, at 1002, by determining a sequence over which at least one of transmit beams of the BS or receive beams of a user equipment (UE) are scanned over different symbols or symbol portions. At 1004, operations 1000 continue by participating in a beam training procedure based on the sequence.

Figure 11:
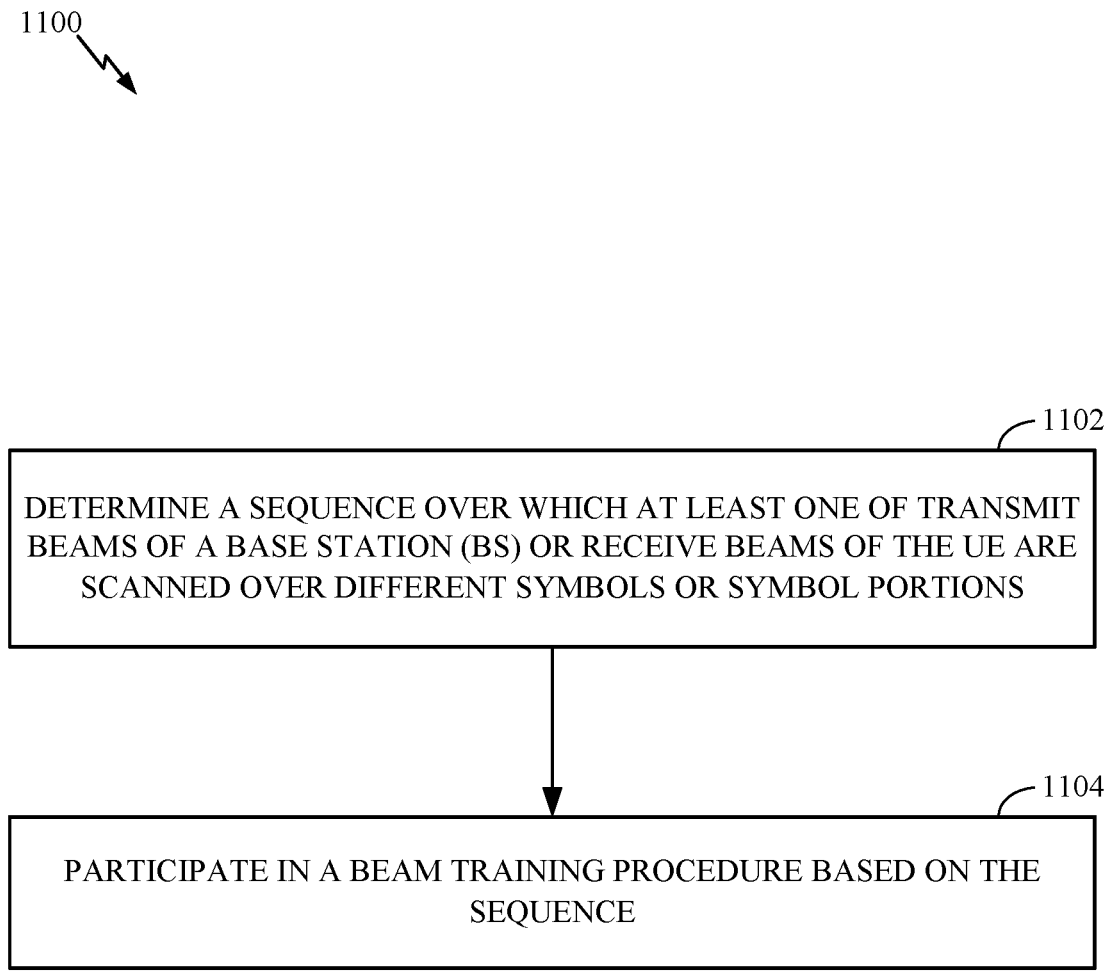
FIG. 11 illustrates example operations that may be performed by a UE, in accordance with certain aspects of the present disclosure.

FIG. 11 illustrates example operations for use by a user equipment (UE), in accordance with certain aspects of the present disclosure. Operations 1100 begin, at 1102, by determining a sequence over which at least one of transmit beams of a base station (BS) or receive beams of the UE are scanned over different symbols or symbol portions. At 1104, operations 1100 continue by participating in a beam training procedure based on the sequence.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   in response to a beam loss between the UE and a network entity, the beam loss associated with a wireless communication link between the UE and the network entity:
      transmitting a beam acknowledgement report to the network entity; and
      participating in a beam recovery procedure via a sequence over which at least one of i) transmit beams of the network entity or ii) receive beams of the UE are scanned over a contiguous set of symbols, wherein the sequence comprises at least a first portion wherein the UE changes receive beams for different symbols of the contiguous set of symbols while receiving a same first transmit beam of the network entity.

2. The method of claim 1, wherein the sequence further comprises:
   at least a second portion, wherein the UE changes receive beams for different symbols of the contiguous set of symbols while receiving a same second transmit beam of the network entity.

3. The method of claim 1, wherein the sequence comprises:
   at least a second portion wherein the UE uses a same first receive beam while receiving different transmit beams of the network entity for different symbols of the contiguous set of symbols.

4. The method of claim 1, further comprising:
   receiving signaling from the network entity including information related to the sequence.

5. The method of claim 4, wherein the signaling is provided via at least one of radio resource control (RRC) signaling, downlink control information (DCI), or multiple access channel control element (MAC-CE).

6. The method of claim 1, further comprising:
   sending a report to the network entity, based on measurements for different transmit receive beam pairs over a certain bandwidth or sub-bands.

7. The method of claim 6, wherein the report is based on complex-valued signal comparisons across multiple transmit and receive beam pair candidates based on different panels or polarizations.

8. The method of claim 6, wherein the report includes at least a portion of a covariance matrix based on post-beamforming received signal vectors across different ports or RF chains.

9. The method of claim 1, wherein transmitting the beam acknowledgement report to the network entity comprises transmitting the beam acknowledgement report in a subframe comprising a physical control channel portion, a data portion, and a common uplink (UL) portion.

10. The method of claim 9, wherein:
the physical control channel portion comprises a physical uplink control channel (PUCCH) portion,
the data portion comprises an uplink data portion, and
and the common UL portion comprises a common UL burst.

11. The method of claim 1, wherein based on participating in the beam recovery procedure, the UE changes its receive beam for communication over the wireless communication link.

12. An apparatus, comprising:
a memory comprising executable instructions; and
a processor in data communication with the memory and configured to execute the instructions to cause the apparatus to perform a method, the method comprising:
in response to a beam loss between the apparatus and a network entity, the beam loss associated with a wireless communication link between the apparatus and the network entity:
transmitting a beam acknowledgement report to the network entity; and
participating in a beam recovery procedure via a sequence over which at least one of i) transmit beams of the network entity or ii) receive beams of the apparatus are scanned over a contiguous set of symbols, wherein the sequence comprises at least a first portion wherein the apparatus changes receive beams for different symbols of the contiguous set of symbols while receiving a same first transmit beam of the network entity.

13. The apparatus of claim 12, wherein the sequence further comprises:
at least a second portion, wherein the apparatus changes receive beams for different symbols of the contiguous set of symbols while receiving a same second transmit beam of the network entity.

14. The apparatus of claim 12, wherein the sequence comprises:
at least a second portion wherein the apparatus uses a same first receive beam while receiving different transmit beams of the network entity for different symbols of the contiguous set of symbols.

15. The apparatus of claim 12, wherein the method further comprises:
receiving signaling from the network entity including information related to the sequence.

16. The apparatus of claim 12, wherein:
the method further comprises receiving signaling from the network entity including information related to the sequence, and the signaling is received via at least one of radio resource control (RRC) signaling, downlink control information (DCI), or multiple access channel control element (MAC-CE).

17. The apparatus of claim 12, wherein the apparatus is millimeter wave (mmWave) enabled.

18. The apparatus of claim 12, wherein the network entity comprises at least one of a central unit (CU), distributed unit (DU), or a remote unit (RU).

19. The apparatus of claim 12, wherein transmitting the beam acknowledgement report to the network entity comprises transmitting the beam acknowledgement report in a subframe comprising a physical control channel portion, a data portion, and a common uplink (UL) portion.

20. The apparatus of claim 19, wherein:
the physical control channel portion comprises a physical uplink control channel (PUCCH) portion,
the data portion comprises an uplink data portion, and
and the common UL portion comprises a common UL burst.

21. The apparatus of claim 12, further comprising at least one antenna and wherein the transmitting is performed using the at least one antenna.

22. The apparatus of claim 12, wherein based on participating in the beam recovery procedure, the apparatus changes its receive beam for communication over the wireless communication link.

23. A method for wireless communications by a network entity, comprising:
receiving a beam acknowledgement report from a user equipment (UE), in response to a beam loss between the UE and the network entity, the beam loss associated with a wireless communication link between the UE and the network entity; and
participating in a beam recovery procedure via a sequence over which at least one of i) transmit beams of the network entity or ii) receive beams of the UE are scanned over a contiguous set of symbols, wherein the sequence comprises at least a first portion wherein the network entity uses a same first transmit beam for different symbols of the contiguous set of symbols, and wherein the network entity signals beam selection assistance information to the UE indicating to the UE to change receive beams for receiving the same first transmit beam for the different symbols of the contiguous set of symbols.

24. The method of claim 23, wherein the sequence further comprises:
at least a second portion, wherein the network entity uses a same second transmit beam for different symbols of the contiguous set of symbols, and wherein the beam selection assistance information further indicates to the UE to change receive beams for receiving the same second transmit beam for the different symbols of the contiguous set of symbols.

25. The method of claim 23, wherein the sequence comprises:
at least a second portion wherein the network entity changes transmit beams for different symbols of the contiguous set of symbols, and wherein the beam selection assistance information further indicates to the UE to use a same first receive beam for receiving the changing transmit beams for the different symbols of the contiguous set of symbols.

26. The method of claim 23, wherein the beam selection assistance information is provided via at least one of radio resource control (RRC) signaling, downlink control information (DCI), or multiple access channel control element (MAC-CE).

27. The method of claim 23, further comprising:
receiving a report from the UE, wherein the report is based on measurements for different transmit receive beam pairs over a certain bandwidth or sub-bands.

28. The method of claim 27, wherein the report is based on complex-valued signal comparisons across multiple transmit and receive beam pair candidates based on different panels or polarizations.

29. The method of claim 27, wherein the report includes at least a portion of a covariance matrix based on post-beamforming received signal vectors across different ports or RF chains.

30. The method of claim 23, wherein receiving the beam acknowledgement report from the UE comprises receiving the beam acknowledgement report in a subframe comprising a physical control channel portion, a data portion, and a common uplink (UL) portion.

31. The method of claim 30, wherein:
the physical control channel portion comprises a physical uplink control channel (PUCCH) portion,
the data portion comprises an uplink data portion, and
and the common UL portion comprises a common UL burst.

32. The method of claim 23, wherein based on participating in the beam recovery procedure, the network entity changes its transmit beam for communication over the wireless communication link.

33. An apparatus, comprising:
a memory comprising executable instructions; and
a processor in data communication with the memory and configured to execute the instructions to cause the apparatus to perform a method, the method comprising:
receiving a beam acknowledgement report from a user equipment (UE), in response to a beam loss between the UE and the apparatus, the beam loss associated with a wireless communication link between the UE and the apparatus; and
participating in a beam recovery procedure via a sequence over which at least one of i) transmit beams of the apparatus or ii) receive beams of the UE are scanned over different symbols of a contiguous set of symbols, wherein the sequence comprises at least a first portion wherein the apparatus uses a same first transmit beam for different symbols of the contiguous set of symbols, and wherein the apparatus signals beam selection assistance information to the UE indicating to the UE to change receive beams for receiving the same first transmit beam for the different symbols of the contiguous set of symbols.

34. The apparatus of claim 33, wherein the sequence further comprises:
at least a second portion, wherein the apparatus uses a same second transmit beam for different symbols of the contiguous set of symbols, and wherein the beam selection assistance information further indicates to the UE to change receive beams for receiving the same second transmit beam for the different symbols of the contiguous set of symbols.

35. The apparatus of claim 33, wherein the sequence comprises:
at least a second portion wherein the apparatus changes transmit beams for different symbols of the contiguous set of symbols, and wherein the beam selection assistance information further indicates to the UE to use a same first receive beam for receiving the changing transmit beams for the different symbols of the contiguous set of symbols.

36. The apparatus of claim 33, wherein the beam selection assistance information is provided via at least one of radio resource control (RRC) signaling, downlink control information (DCI), or multiple access channel control element (MAC-CE).

37. The apparatus of claim 33, wherein the apparatus is millimeter wave (mmWave) enabled.

38. The apparatus of claim 33, wherein the apparatus is at least one of a central unit (CU), distributed unit (DU), or a remote unit (RU).

39. The apparatus of claim 33, wherein receiving the beam acknowledgement report from the UE comprises receiving the beam acknowledgement report in a subframe comprising a physical control channel portion, a data portion, and a common uplink (UL) portion.

40. The apparatus of claim 39, wherein:
the physical control channel portion comprises a physical uplink control channel (PUCCH) portion,
the data portion comprises an uplink data portion, and
and the common UL portion comprises a common UL burst.

41. The apparatus of claim 33, further comprising at least one antenna and wherein the receiving is performed using the at least one antenna.

42. The apparatus of claim 33, wherein based on participating in the beam recovery procedure, the apparatus changes its transmit beam for communication over the wireless communication link.

43. A user equipment (UE) configured for wireless communication, comprising:
at least one processor;
a memory communicatively coupled to the at least one processor; and
a transceiver communicatively coupled to the at least one processor, wherein the at least one processor is configured to:
in response to a beam loss between the UE and a network entity, the beam loss associated with a wireless communication link between the UE and the network entity:
utilize the transceiver to transmit a beam acknowledgement report to the network entity; and
utilize the transceiver to participate in a beam recovery procedure via a sequence over which at least one of i) transmit beams of the network entity or ii) receive beams of the UE are scanned over a contiguous set of symbols, wherein the sequence comprises at least a first portion wherein the UE changes receive beams for different symbols of the contiguous set of symbols while receiving a same first transmit beam of the network entity.

44. The UE of claim 43, wherein the sequence further comprises:
at least a second portion, wherein the UE changes receive beams for different symbols of the contiguous set of symbols while receiving a same second transmit beam of the network entity.

45. The UE of claim 43, wherein the sequence comprises:
at least a second portion wherein the UE uses a same first receive beam while receiving different transmit beams of the network entity for different symbols of the contiguous set of symbols.

46. The UE of claim 43, wherein the at least one processor is further configured to:
utilize the transceiver to receive signaling from the network entity including information related to the sequence.

47. The UE of claim 46, wherein the signaling is received via at least one of radio resource control (RRC) signaling, downlink control information (DCI), or multiple access channel control element (MAC-CE).

48. The UE of claim 43, wherein the at least one processor is further configured to:
utilize the transceiver to send a report to the network entity, based on measurements for different transmit receive beam pairs over a certain bandwidth or sub-bands.

49. The UE of claim 48, wherein the report is based on complex-valued signal comparisons across multiple transmit and receive beam pair candidates based on different panels or polarizations.

50. The UE of claim 48, wherein the report includes at least a portion of a covariance matrix based on post-beamforming received signal vectors across different ports or RF chains.

51. The UE of claim 43, wherein the UE is millimeter wave (mmWave) enabled.

52. The UE of claim 43, wherein the network entity comprises at least one of a central unit (CU), a distributed unit (DU), or a remote unit (RU).

53. The UE of claim 43, further comprising at least one antenna, and wherein the processor further utilizes the at least one antenna to transmit the beam acknowledgement report.

54. The UE of claim 43, wherein the at least one processor being configured to utilize the transceiver to participate in the beam recovery procedure comprises the at least one processor being configured to utilize the transceiver to change its receive beam for communication over the wireless communication link.

55. A network entity, comprising:
at least one processor;
a memory communicatively coupled to the at least one processor; and
a transceiver communicatively coupled to the at least one processor, wherein the at least one processor is configured to:
utilize the transceiver to receive a beam acknowledgement report from a user equipment (UE), in response to a beam loss between the UE and the network entity, the beam loss associated with a wireless communication link between the UE and the network entity; and
utilize the transceiver to participate in a beam recovery procedure via a sequence over which at least one of i) transmit beams of the network entity or ii) receive beams of the UE are scanned over a contiguous set of symbols, wherein the sequence comprises at least a first portion wherein the network entity uses a same first transmit beam for different symbols of the contiguous set of symbols, and wherein the network entity signals beam selection assistance information to the UE indicating to the UE to change receive beams for receiving the same first transmit beam for the different symbols of the contiguous set of symbols.

56. The network entity of claim 55, wherein the sequence further comprises:
at least a second portion, wherein the network entity uses a same second transmit beam for different symbols of the contiguous set of symbols, and wherein the beam selection assistance information further indicates to the UE to change receive beams for receiving the same second transmit beam for the different symbols of the contiguous set of symbols.

57. The network entity of claim 55, wherein the sequence comprises:
at least a second portion wherein the network entity changes transmit beams for different symbols of the contiguous set of symbols, and wherein the beam selection assistance information further indicates to the UE to use a same first receive beam for receiving the changing transmit beams for the different symbols of the contiguous set of symbols.

58. The network entity of claim 55, wherein the beam selection assistance information is provided via at least one of radio resource control (RRC) signaling, downlink control information (DCI), or multiple access channel control element (MAC-CE).

59. The network entity of claim 55, wherein the at least one processor is further configured to:
utilize the transceiver to receive a report from the UE, wherein the report is based on measurements for different transmit receive beam pairs over a certain bandwidth or sub-bands.

60. The network entity of claim 59, wherein the report is based on complex-valued signal comparisons across multiple transmit and receive beam pair candidates based on different panels or polarizations.

61. The network entity of claim 59, wherein the report includes at least a portion of a covariance matrix based on post-beamforming received signal vectors across different ports or RF chains.

62. The network entity of claim 55, wherein the network entity is millimeter wave (mmWave) enabled.

63. The network entity of claim 55, wherein the network entity is at least one of a central unit (CU), distributed unit (DU), or a remote unit (RU).

64. The network entity of claim 55, further comprising at least one antenna, and wherein the processor further utilizes the at least one antenna to receive the beam acknowledgement report from the UE.

65. The network entity of claim 55, wherein the at least one processor being configured to utilize the transceiver to participate in the beam recovery procedure comprises the at least one processor being configured to utilize the transceiver to changes its transmit beam for communication over the wireless communication link.

* * * * *